United States Patent

[11] 3,554,526

| [72] | Inventors | Seizho Ohta;<br>Motokuni Kage, Toyota, Japan |
|---|---|---|
| [21] | Appl. No. | 747,888 |
| [22] | Filed | July 26, 1968 |
| [45] | Patented | Jan. 12, 1971 |
| [73] | Assignee | Toyota Jidosha Kogyo Kabushiki Kaisha<br>Toyota, Japan<br>a corporation of Japan |
| [32] | Priority | Aug. 3, 1967 |
| [33] | | Japan |
| [31] | | No. 42/49932 |

[54] SEAT CUSHIONING SPRING DEVICE
1 Claim, 5 Drawing Figs.

[52] U.S. Cl........................................ 297/109,
267/103
[51] Int. Cl........................................ A47c 7/20,
A47c 23/00
[50] Field of Search........................................ 297/452,
456; 267/102, 103, 107, 144

[56] References Cited
UNITED STATES PATENTS

| 2,705,632 | 4/1955 | Flint.............................. | 267/144 |
| 2,936,823 | 5/1960 | Neely............................ | 297/456 |

*Primary Examiner*—Casmir A. Nunberg
*Attorney*—Connolly and Hutz

ABSTRACT: Seat comprises seat frame with seat frame line elastically supported above seat frame. Zigzag-line spring members are stretched in parallel over spring frame line between forward and rearward portions of line. Seat cushioning spring device includes upwardly extending portion of front of seat frame located behind forward portion of seat frame line and terminal portions of zigzag-line spring members folded back in acute angle from forward portion of seat frame line to connection points on upwardly extending portion of seat frame. Upwardly extending portion on seat frame supports zigzag-line spring members on seat frame line when excessive load is placed upon seat cushioning spring device.

PATENTED JAN 12 1971   3,554,526

SEAT CUSHIONING SPRING DEVICE

BACKGROUND AND SUMMARY OF THE INVENTION

The present invention relates to a cushioning spring device for a seat. The primary object of the present invention resides in a device that provides sitting comfort by providing a desirable sitting profile curve formed by designing the forward part of a seat frame so that it bears or supports the spring member on the front edge of a seat cushion supporting the forward end of a human thigh when the seat surface is imposed with a more than normal load thereby increasing the spring constant of the top surface of the spring member and suppressing the vibration of the cushioning surface without extremely promoting the deflection of the top surface of the cushioning spring member.

Another object of the present invention is to provide a seat cushioning spring device that allows the forward part of the top of the spring member to be supported by the rising front edge of the seat frame.

Still another object of the instant invention is to provide a seat cushioning spring device which utilizes less spring material and at the same time reduces the number of steps in bending or otherwise fabricating the spring member.

BRIEF DESCRIPTION OF THE DRAWING

Novel features and advantages of the present invention will become apparent to one skilled in the art from a reading of the following detailed description in conjunction with the accompanying drawing wherein similar reference characters refer to similar parts and in which.

DETAILED DESCRIPTION OF THE INVENTION

Figure 1:
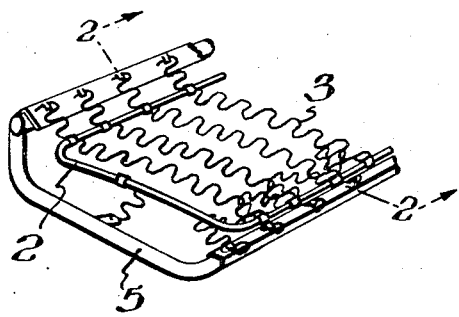
FIG. 1 is a perspective view of a conventional seat cushioning spring device.
Figure 2:
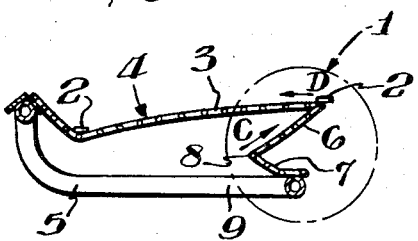
FIG. 2 is a sectional view taken along line 2-2 of FIG. 1.

In the conventional seat cushioning spring device of a vehicle, particularly that of an automobile, for example, at the forward edge (indicated by the circle 1 of FIG. 2) the seat frame 5 is fitted with a forward part formed like a fish mouth from the top member 4 of zigzag-line spring members 3 stretched on a seat frame line 2. When the first bend 6 of each spring member 3 is set too flat a human load forces the forward end of the top member 4 into full contact with the first bend 6. Further, when the load on the top member 4 of the seat surface increases through vibration of the vehicle in which the seat is located the crossing point 8 of the first bend 6 and the second bend 7 of the spring member 3 shifts in the direction of arrow C. With a heavy load falling on the second bend 7 the fixture 9 of the seat frame 5 is often damaged.

Meanwhile, if the first bend 6 of the spring member 3 sharply rises, under a human load the seat frame line 2 supporting the top member 4 is deflected backward relative to the seat in the direction of arrow D. As a result of the deflection the top member 4 is promoted without forming a desirable sitting profile curve, and at the same time the too steep rise of the first bend 6 hampers the vertical deflection of the front edge of the cushion, i.e., the front edge of the seat frame line 2.

Thus, when the forward part of the top member 4 of the zigzag-line spring member 3 is formed like a fish mouth, it is exceedingly difficult to set an appropriate angle for the first bend 6. On the other hand, improved road conditions and the improvement in the spring systems of vehicles have rendered it needless to provide a large deflection of the seat cushion. For these reasons, great flexibility of the front edge of seat cushion will only aggravate the unnecessary amplitude of vibration thereby injuring the seating comfort. Also, the number of steps in bending or otherwise fabricating the spring member 3 is increased and the weight is also increased.

Figure 3:
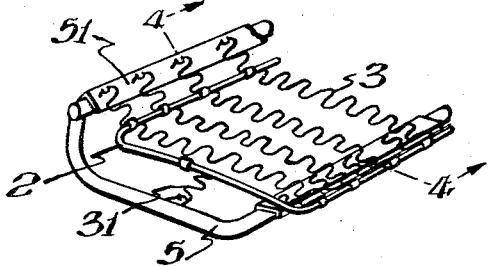
FIG. 3 is a perspective view of an embodiment of the present invention.

In the present invention instead of the forward part of the top member of the zigzag-line spring member being formed like a fish mouth the spring member is folded back in acute angle from the front edge of the seat frame line to droop down. The down-drooping portion of the spring member is fitted behind the front edge of the seat frame line to the forward end of the frame rising from the bottom whereby the forward end of the frame can bear or support the spring member on the seat frame line. The composition of the present invention is described below with reference to FIGS. 3—5.

Figure 4:
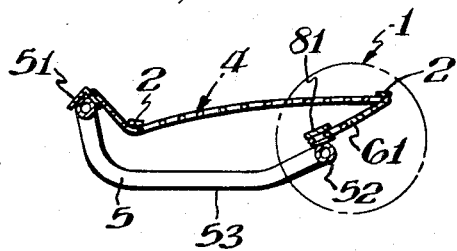
FIG. 4 is a sectional view taken along line 4-4 of FIG. 3.

To form the front edge of the seat cushioning spring device as illustrated by 1 in FIG. 4, first on the seat frame line 2 constituting the outer frame of the seat top a plurality of the so-called formed springs or the so-called S-springs automatically formed by zigzag machinery, for example, are stretched in parallel as zigzag-line spring members 3 in longitudinal or transverse directions to form the seat top 4. The rear ends of the spring members 3 are linked to the rear end 51 of the seat frame 5. Both sides of the seat frame line 2 and both sides of the seat frame 5 are elastically connected using spring members 31 made of zigzag-line springs or coil springs.

Next, the forward part 52 of the seat frame 5 is made to rise from the bottom 53 of the frame 5 and to take the backward position relative to the front edge of the seat frame line 2. Then the end of the bend 61 in the spring member 3, i.e., the part folded back in acute angle from the front edge of the seat frame line 2 and drooping rearward is fitted to the front end 52 of the seat frame 5. The acute angle may preferably be around 30°.

Figure 5:
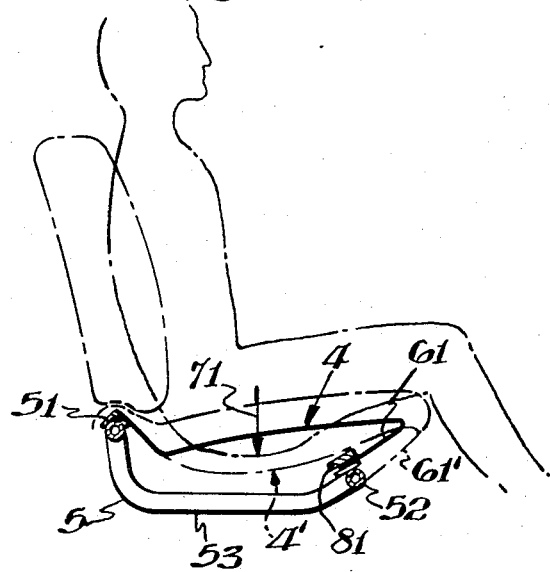
FIG. 5 is a side elevational view of the spring device of FIG. 4 deflected under load.

When a more than normal load acting along the extension line of the human hipbone joint 71, as shown in FIG. 5, falls on the top of the seat equipped with the seat cushioning spring device of this invention, the front end 52 of the seat frame 5 bears or supports the forward part of the top 4 of the spring member on the seat frame line 2. The top 4 of the spring member 3 and its bend 61 are deflected to 4' and 61', as indicated by phantom outline.

Meanwhile, 81 is a member fitted to the joint of the front end 52 of the seat frame and the end of the bend 61 by means of snap rings for the purpose of both buffering and preventing the creaking caused when the front end 52 of the seat frame bears or supports the top 4 of the spring member. The member 81 for buffering and preventing the creaking may be constructed of sponge, felt or the like.

As described above, according to the present invention, even when a more than normal load falls on the seat top, the front end of the seat frame bears or supports the forward part of the top of the spring member on the seat frame line supporting the front end of the human thigh. Therefore, the front edge of the cushion which is in contact with the front end of the human thigh is deflected appropriately dependent on the leg movement under, for example, the driving action of the automobile. Moreover, when the human body swings laterally, the front edge of the cushion will offer a prop which prevents any extreme deflection thereby suppressing the vibration of the cushion surface which is harmful to sitting comfort and thus forming a desirable sitting profile curve with a wide improvement in the sitting comfort on the seat. Moreover, the required load deflection characteristic of the seat top can be easily set by appropriate selection of the angle of bend and the wire diameter of the spring.

Since the front edge of cushion is not formed like a fish mouth there is no need for a second bend in the zigzag-line spring member. Accordingly, both the quantity of spring material and the number of steps in bending the spring member are reduced and in addition, the longitudinal length of the seat frame is made shorter than in a conventional seat. All these modifications will result in remarkable effects of drastically lowering the weight and cost of the seat.

It should be noted that though the description here is confined to the seat of a vehicle, particularly of an automobile, the technical idea underlying this invention will be universally applicable to the other seats in general.

We claim:

1. A seat comprising a seat frame and a seat frame line elastically supported above the seat frame, zigzag-line spring members stretched in parallel over the seat frame line between forward and rearward portions of the line, a seat cushioning spring device including an upwardly extending portion of the front of the seat frame located behind the forward portion of the seat frame line, and terminal portions of the zigzag-line spring members folded back in acute angle from the forward portion of the seat frame line to connection points on the upwardly extending portion of the seat frame, means for buffering and dampening noise located between the upwardly extending portion of the seat frame and the underside of the zigzag-line spring members stretched in parallel over the seat frame line, the upwardly extending portion of the seat frame supportingly engaging the zigzag-line spring members on the seat frame line when an excessive load is placed upon the seat.